(12) United States Patent
Bastide et al.

(10) Patent No.: US 10,616,160 B2
(45) Date of Patent: *Apr. 7, 2020

(54) ELECTRONIC RUMOR CASCADE MANAGEMENT IN COMPUTER NETWORK COMMUNICATIONS

(71) Applicant: International Business Machines Corporation, Armonk, NY (US)

(72) Inventors: Paul R. Bastide, Boxford, MA (US); Thomas J. Evans, IV, Cary, NC (US); Vijay Francis, Nashua, NH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/035,873

(22) Filed: Jul. 16, 2018

(65) Prior Publication Data

US 2018/0324127 A1    Nov. 8, 2018

Related U.S. Application Data

(63) Continuation of application No. 14/736,397, filed on Jun. 11, 2015, now Pat. No. 10,110,531.

(51) Int. Cl.
*H04L 12/58* (2006.01)
(52) U.S. Cl.
CPC .............. *H04L 51/12* (2013.01); *H04L 51/32* (2013.01)
(58) Field of Classification Search
CPC ................................ H04L 51/12; H04L 51/32
See application file for complete search history.

(56) References Cited

U.S. PATENT DOCUMENTS 5,889,943 A * 3/1999 Ji ......................... G06F 21/564
                                                             713/188
8,458,046 B2    6/2013 Myslinski
(Continued)

FOREIGN PATENT DOCUMENTS

WO         2011139687 A1    11/2011

OTHER PUBLICATIONS

Kumar, KP et al., "Detecting Misinformation in Online Social Networks using Cognitive Psychology" Human-centric Computing and Information Sciences (Sep. 2014) pp. 1-20, vol. 4, No. 14.

(Continued)

*Primary Examiner* — Arvin Eskandarnia
(74) *Attorney, Agent, or Firm* — Scully, Scott, Murphy & Presser, P.C.; Ryan G. Lewis

(57) ABSTRACT

Controlling cascade of information transmitted and received via one or more online data sharing platforms and electronic communication network. A message to be shared is detected. The message and the corresponding message stream may be analyzed. An action may be taken upon the message responsive to one or more criteria being met based on analyzing the message and the corresponding message stream. The action may include at least forcing a fact check of the message that determines veracity of the message. The action may also include one or more of removing the message, disabling the message, allowing conditional sharing of the message, or allowing the message to be shared. The one or more criteria may include at least determining a confidence value below a threshold value that indicates the message is non-factual.

19 Claims, 4 Drawing Sheets

(56) References Cited

U.S. PATENT DOCUMENTS

| | | | |
|---|---|---|---|
| 8,856,232 B1 | 10/2014 | Swerdlow et al. | |
| 8,909,569 B2 | 12/2014 | Spivack et al. | |
| 2012/0272160 A1* | 10/2012 | Spivack | G06Q 10/10 715/752 |
| 2013/0018823 A1 | 1/2013 | Masood | |
| 2014/0297764 A1* | 10/2014 | Skiba | H04M 3/5175 709/206 |
| 2014/0298463 A1 | 10/2014 | Zheng et al. | |
| 2015/0088897 A1 | 3/2015 | Sherman et al. | |
| 2015/0188870 A1* | 7/2015 | Sharp | H04L 51/22 715/752 |
| 2015/0281156 A1* | 10/2015 | Beausoleil | H04L 51/14 709/206 |

OTHER PUBLICATIONS

Friggeri, A. et al., "Rumor Cascades" Proceedings of the Eighth International AAAI Conference on Weblogs and Social Media (May 2014) pp. 101-110.

"Facebook Launches Advances AI Effort to Find Meaning in Your Posts" Slashdot (Sep. 2013) http://tech.slashdot.org/story/13/09/21/1831239/facebook-launches-advanced-ai-effort-to-find-meaning-in-your-posts, accessed on Jun. 10, 2015, 21 pages.

"Deep learning" Wikipedia, http://en.wikipedia.org/wiki/Deep_learning, accessed Jun. 10, 2015, 13 pages.

Reed, F., "Facebook Looks to Improve News Feed Content Quality" Marketing Pilgrim (Aug. 2013) http://www.marketingpilgrim.com/2013/08/facebook-looks-to-improve-news-feed-content-quality.html, accessed Jun. 10, 2015, 6 pages.

"Natural language processing" Wikipedia, http://en.wikipedia.org/wiki/Natural_language_processing, accessed Jun. 10, 2015, 10 pages.

"IBM SPSS Statistics" http://www-01.ibm.com/software/analytics/spss/products/statistics/ accessed Jun. 10, 2015, 2 pages.

"SPSS Text Analytics for Surveys" http://www-03.ibm.com/software/products/en/spss-text-analytics-surveys accessed Jun. 10, 2015, 2 pages.

List of IBM Patents or Patent Applications Treated as Related, dated Jul. 16, 2018, 2 pages.

* cited by examiner

ELECTRONIC RUMOR CASCADE MANAGEMENT IN COMPUTER NETWORK COMMUNICATIONS

FIELD

The present application relates generally to computers and computer applications, and more particularly to computer networks and communication and managing electronic rumor cascades.

BACKGROUND

Electronic mail clients and online social networks provide universal mechanisms to connect people and information in logical and organized ways and enable sharing and processing of information between the users. Examples of mechanisms of sharing and processing information include the inbox, wall, activity stream, timeline, and profile. These mechanisms enable one to rapidly share information with others and gather information from others in the computer networks.

Online social networks provide a substrate for rumor propagation. Recognizing that information received via friends tends to be trusted, online social networks usually allow individuals to transmit information to many friends at once. The trust between friends is impacted based on posts.

However, many rumors, advertising and non-factual cascades far out live the useful life span. False attributions may occur on outdated information that has been circulating online.

BRIEF SUMMARY

A computer-implemented method and system of controlling cascade of information transmitted and received via one or more online data sharing platforms and electronic communication may be provided. The method may be performed by one or more processors, and may comprise determining that a message is to be shared. The method may also comprise analyzing the message and corresponding message stream. The method may further comprise queuing the message. The method may also comprise taking an action upon the message responsive to one or more criteria being met based on the analyzing. The action may comprise at least forcing a fact check of the message that determines veracity of the message. The action may comprise one or more of removing the message, disabling the message, allowing conditional sharing of the message, or allowing the message to be shared. The one or more criteria may comprise at least determining a confidence value below a threshold value that indicates the message is non-factual. In one aspect, the method may reduce or prevent spreading of information determined to be non-factual or harmful.

A system of controlling cascade of information transmitted and received via one or more online data sharing platforms and electronic communication network, in one aspect, may comprise one or more processors and a memory device coupled to one or more of the processors. One or more of the processors may be operable to determine that a message is to be shared. One or more of the processors may be further operable to analyze the message and corresponding message stream. One or more of the processors may be further operable to queue the message on the memory device. One or more of the processors may be further operable to take an action upon the message responsive to one or more criteria being met based on the analyzing. In one aspect, the action may comprise at least forcing a fact check of the message that determines veracity of the message. The action may also comprise one or more of removing the message, disabling the message, allowing conditional sharing of the message, or allowing the message to be shared. The one or more criteria may comprise at least determining a confidence value below a threshold value that indicates the message is non-factual. In one aspect, the system may reduce or prevent spreading of information determined to be non-factual or harmful.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
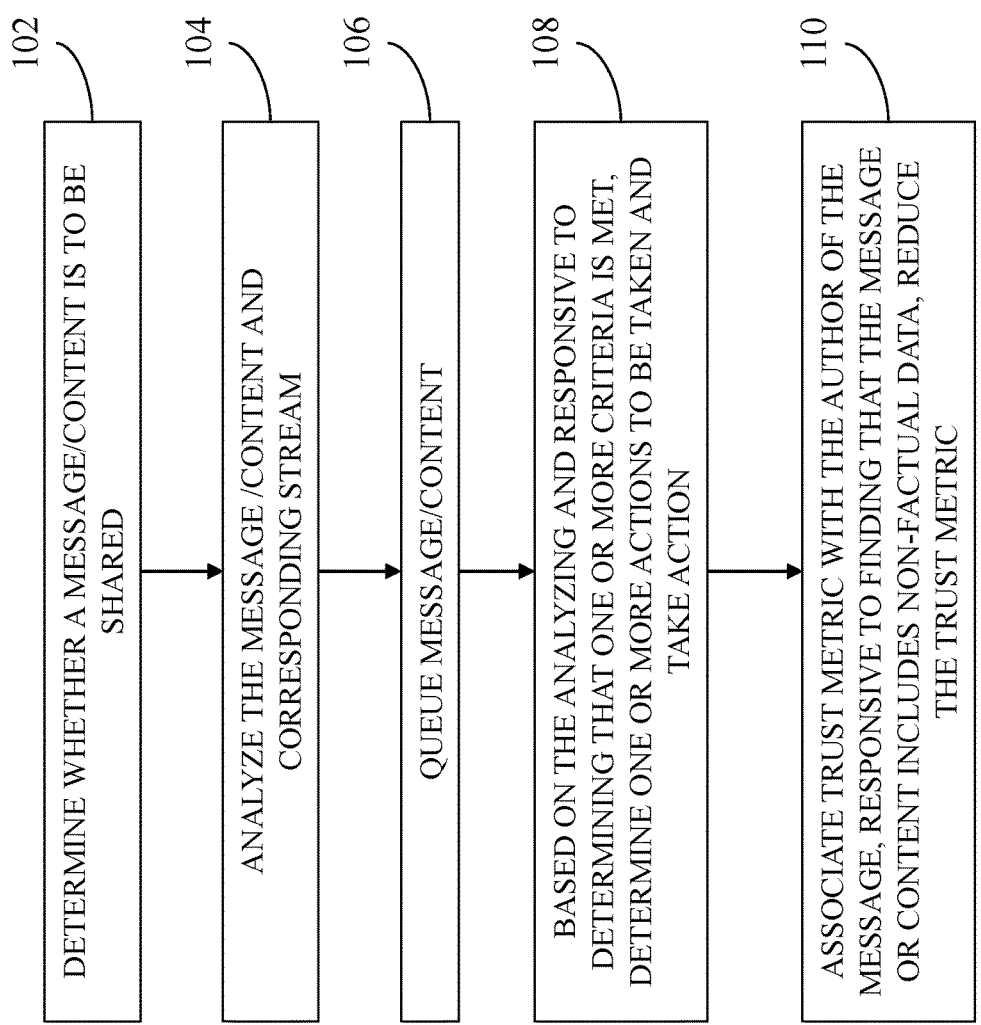
FIG. 1 is a flow diagram illustrating a method of controlling spread or cascade of information transmitted and received via one or more online data sharing platforms and electronic communication network in one embodiment of the present disclosure.

A system and method of the present disclosure in one embodiment may provide for controlling the sharing of online communication data, for example, posts and messages on the Internet, e.g., via online social network platform, electronic mail (e-mail), and others. The system and/or method of the present disclosure in one embodiment may allow for controlling of the spread of non-factual or harmful information in order to prevent false or harmful rumor cascades.

In one aspect, the system and/or method may determine that a message is going to be shared among users via an electronic communication or computer network, e.g., to be posted to or replied to. The message and the corresponding stream may be analyzed. The message, e.g., posted or replied to message may be queued in a memory device. Responsive to determining that a condition is reached or satisfied, an action may be taken on the message, e.g., posted or replied to message.

Examples of actions taken on the message may include, but are not limited to, forcing a fact check to be performed on the message, removing the posted or replied to message, only allowing a conditional resharing of the message, allowing to share the message only if an expert shared or shares the message also, delegating a reviewer (e.g., another user) to review the message and allowing sharing of the message only if the reviewer verifies the message is true, checking the tone of comments on the message (e.g., in more than only the prior poster's stream) and allowing sharing only if the comments indicate a general agreement or consensus to the message. In another aspect, it may be determined to take no action.

The system and/or method of the present disclosure may work in a computing environment such as collaboration and social systems such as email systems and social networking systems, for example, including asynchronous networks (e.g., where a user may follow another user via an online social network or like platform), synchronous networks (e.g., where users connect to one another and carry on a conversation via an online social network or like platform), instant messaging, wiki, and others.

The system and/or method of the present disclosure in one embodiment may provide for efficient collaboration portfolio, for example, by reducing unnecessary data transmission and storage in collaboration and social systems. By reducing the sharing of rumors, improvements to the computer system or networks themselves are provided in that, for example, there is a less need for storage of data thereby reducing storage or memory space, and that there is less amount of data being transmitted (e.g., less data traffic) in the computer communication networks. The system and/or method of the present disclosure also allow for focusing on high quality data.

The system and/or method may use data associated with online social network members, posts and associated data (e.g., authors, content, readers), actions on the post (e.g., removal, promotion, like, comment, share, @mentions), and post/comments analytics (e.g., sentiment, tone of comments, natural language, downstream shares, upstream shares).

FIG. 1 is a flow diagram illustrating a method of controlling spread or cascade of information transmitted and received via one or more online data sharing platforms and electronic communication network in one embodiment of the present disclosure. The method may be performed by one or more processors. At 102, it is detected or determined whether a message or content is to be shared. For example, a computer module or function may be implemented to hook onto a program method or component of an online data sharing platform (e.g., share methods such as create, update) to detect a message that is to be shared. Hooking may be implemented, for example, by injecting a code or like computer instructions, for example, that may catch or intercept events, function calls, or the like between operating components of the online data sharing platform, electronic communication network, or the like to detect, for example, whether the message is being shared or replied to. Other implementation techniques may be utilized for hooking functionality. Such hooking may detect posts, comments, and actions of users such as removing, promoting, liking, commenting, sharing, @mention-ing. Such hooking function may be implemented to listen to Document Object Model (DOM) changes such as Hypertext Markup Language (HTML) documents, listening to compliance and analytics streams (e.g., social media aggregation application programming interfaces (APIs), and listening to submit and/or post button for postings. The online data sharing platforms may include, but are not limited to, electronic mail, instant message platform, wiki, online social network platform comprising wall, activity stream, timeline, profile.

At 104, the message or content, and corresponding stream, are analyzed. The corresponding stream refers to other messages or content that is in the message stream of the message or determined to be shared, for example, a chain of emails, which the message or content is part of, a chain of posts on a social network web page, which the message or content is part of.

Upon detecting the share on the hook, the method may include retrieving the key identifier for the post which is to be shared. In one embodiment, data attribute such as a correlation identifier, parent-identifier may be used or the DOM may be inspected, to identify or determine parent-child relationship on the messages. The method may also include extracting the natural language of the related posts, and related metadata.

The analysis at 104 may include analyzing the message, its author, content, and readers, analyzing actions on the message (e.g., removal, promotion, like, comment, share, @mention), analyzing sentiment, tone of comments (e.g., by analyzing thread/conversation graph, e.g., checking the tone (sentiment) of the message based on the corresponding stream), downstream shares and upstream shares of the message, and identifies those attributes of the message. The analysis at 104 may also include analyzing by one or more of natural language processing technique, extracting keywords from text of the message and corresponding stream, text analysis technique that develops a regression model associated with the message and corresponding stream. The analyzing, for example, may determine the subject or topic of the message or post, opinion and sentiment about the message or post, and the tone of the comments related to the message or post.

Another example of analyzing may include checking the tone of comments on the message. For instance, the thread or conversation graph of the conversation or message stream involving the message may be analyzed to determine the general sentiment about the quality of the post (message/content). The tone of comments may be checked in more than only the prior poster's stream. If the tone of comments indicates generally agreement, then the message may be shared or posted.

At 106, the message or content is queued, for example, on a memory device or a storage device, for example, coupled to one or more of the processors that may perform the method.

At 108, responsive to determining that one or more criteria is met based on the analyzing, an action may be taken. For instance, based on the analysis, it is determined whether the message or post is a candidate for not sharing or preventing from spreading, and hence, further action is taken. A criterion, for example, may include determining that the content of the message cannot be verified as being credible, for instance, the message content has confidence value below a threshold value that indicates whether the message is likely to be non-factual.

An action may include one or more of forcing a fact check of the message that determines veracity of the message, one or more of removing the message, disabling the message, allowing conditional sharing of the message (e.g., only if the message is posted by an expert on the topic of the message, only after the message is delegated to an identified expert for review and approved), or allowing the message to be shared. In this way, spread of information determined to be non-factual or harmful is reduced or prevented.

An example action may include forcing a fact check. Forcing a fact check of the message may include scanning the message or content and identifying corresponding confidence in the veracity of the message or content. One or more existing techniques may be utilized to determine confidence value associated with the veracity of the content. Forcing a fact check may also include presenting rules (e.g., evidence from a trusted source that may explain why the content may be non-factual, e.g., a corresponding evidence from a trusted source points to a hoax), which state the reason or confidence in the veracity and prompting for secondary approval based on fact check confidence. For instance, the author of the message may be prompted for secondary approval.

Another example of an action may include removing message copies for further transmission (e.g., retweet) or disabling the re-messaging capability or another functionality that would have an effect of propagating the message further to others. For instance, a 'like' or another approval functionality further propagates the message of a social network by notifying other users (on their social network page, wall, activity stream or the like) who follow the user who indicated a 'like' or approval of the message. In one aspect, the sentiment of the conversation may be analyzed, and the message or content may be deleted from the user's stream. The original poster's conversation may be also deleted. In another aspect, the conversation or the posted message may be hidden from the user's web page, activity stream, wall or the like. Still yet, the continuation of the stream may be disabled, e.g., by locking a conversation. If, for example, the message is in an email, any forwarding or reply to actions may be prevented on that email, e.g., using a lock functionality that may be provided with forum products.

Another example of an action may include conditional reshare. Conditionally resharing may include identifying an expert for a topic of the message. For instance, based on the analysis of the message or content, it may be determined that the topic of the message is directed to engineering. Also, based on the analysis, it may be determined that the author or a poster of the message or content is an expert on engineering. In this instance, the condition that an expert of a topic posted or authored the message associated with the topic is satisfied, and hence the message may be shared.

In another aspect, to perform conditional resharing actions, a message thread may be monitored to determine whether the author or a poster to the thread is an expert. Responsive to determining that the author or the poster is an expert, the message may be automatically shared. Optionally, the expert's post may be highlighted to annotated with another graphically indication. Yet in another aspect, the message may undergo a secondary approval process. Still in another aspect, the message may be sent to delegated to an identified expert for review and approval to share the message. Still in another aspect, trusted advisors in the user's network may be polled to determine their opinion on the veracity of the message prior to posting or not posting for sharing.

In one embodiment, an example of an action may also include doing nothing with the shared post.

At 110, a trust metric may be associated with an author of the message, and the trust metric may be reduced responsive finding that the message or content includes non-factual data. For example, a set of trust metrics may be implemented for users. A user may set a trust metric for each of the user's connections. If the user finds non-factual data in another user's stream, the user may reduce the trust metric associated with that other user, kept by the user. In this way, the user can reduce the user's view of that other user's trust metric. In another aspect, if it is determined that a user has shared without fact checking, that user's trust metric may be reduced. Still yet, if it is determined that a user has previously sent non-factual data, the user's trust metric may be further reduced. The trust metric may be used to filter a view of information. The trust metric may be added responsive to a user sharing information or message without fact checking.

Figure 2:
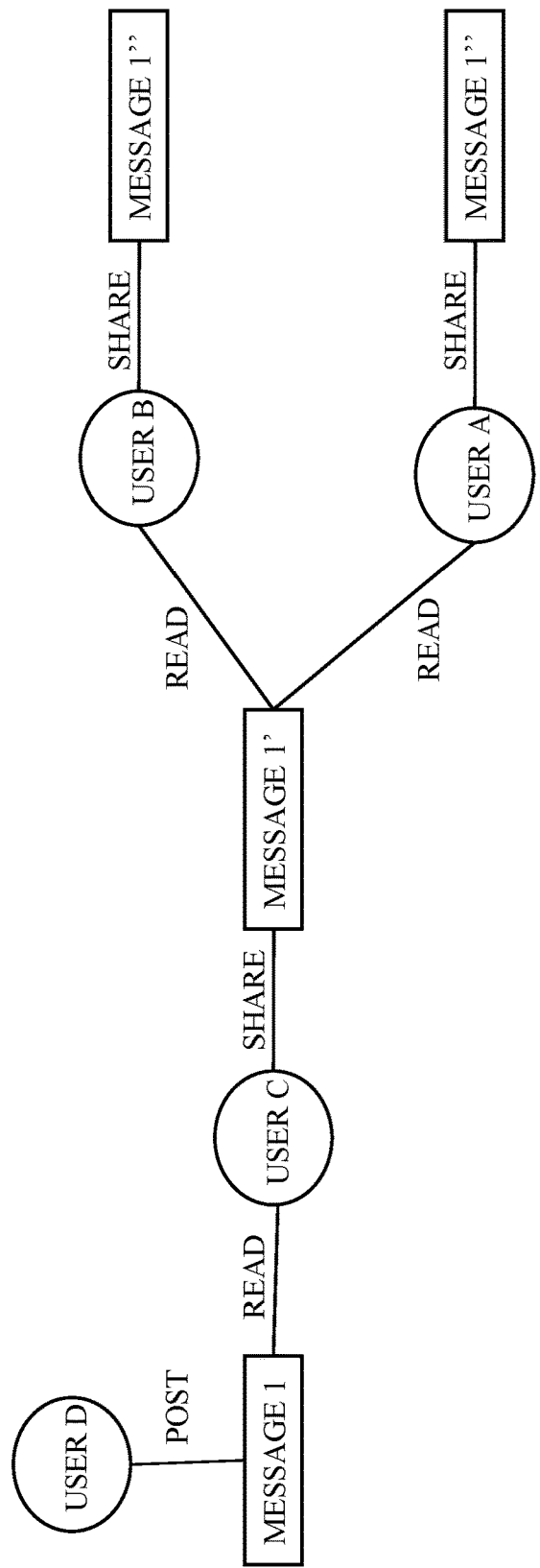
FIG. 2 illustrates a use scenario in one embodiment of the present disclosure.

FIG. 2 illustrates a use scenario in one embodiment of the present disclosure. User A, User B, User C and User D are members of an online social network. User A, User B and User C are connected. User C and User D are also connected. User D posts a message to User C. The above-described methodology with reference to FIG. 1 may be performed on User D's message even before it reaches User C, e.g., so that User D's message is prevented from reaching its recipient. In another aspect, the methodology may be performed responsive to User C receiving the message, e.g., so that User C would not be above to further propagate the message to any of User C's connection.

In another embodiment, the methodology of the present disclosure may be activated after a defined number of shares of the original content, e.g., 2 shares. For example User D shares the message with User D's network of connections (which e.g., may include User C). User C shares the message with User B and User A. Responsive to User B and/or User A posting the message for further sharing, the above described functionality for determining whether to prevent further cascade of the message may be activated. As described above, a trust metric may be generated and associated with each user's connection on the social network. In one aspect, the analysis that may include heavy computationally may be performed asynchronously. A confidence measure generated for measuring the veracity of the message may be attributed to a user's trust metric, and the trust metric may be used in subsequent calculations.

Figure 3:
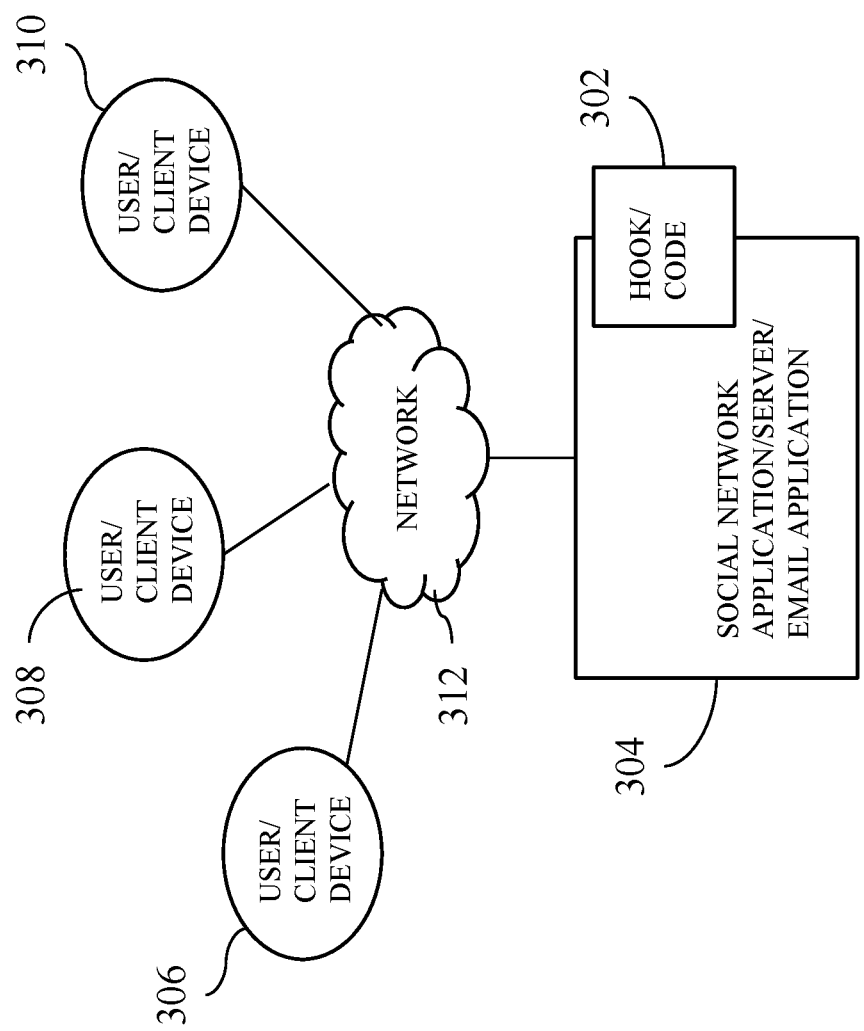
FIG. 3 is a diagram illustrating system components that may control cascade of information, for example, in online social network platforms or electronic mail systems, in one embodiment of the present disclosure.

The functionality described above may be implemented as a component of a messaging system or a social network system. FIG. 3 is a diagram illustrating system components that may control cascade of information, for example, in an online social network platform or electronic mail system, in one embodiment of the present disclosure. In one aspect, the component 302 may be a plug-in component or a hook that include a capability to intercept function calls, events or the like in the online social network platform or electronic mail system 304. In another aspect, the technique or methodology described above may be implemented integrally with such online social network platform or electronic mail system 304.

In another aspect, the component 302 or the like functionality may be implemented on a client device (e.g., 306, 308, 310), for example, depending on an application type. For instance, for email applications, the intelligence for detecting and performing an action to reduce or prevent further spreading or cascading of information contained in a message may implemented on a client side of the application.

One or more users, for example, who are members of a social network, may communicate via user devices (e.g., 306, 308, 310) over a computer network 312, with other members of the social network, e.g., their connections established on a social network application or server 304. The social network application 304, for example, allows the user to send a message, post a message, like (approve) a posted message and the like, for example for sharing with other members or connections on the social network. The component 302, e.g., detects the message or posted content is to be shared or replied to, for example, by catching or intercepting an event occurring in the social network application 304 as a result of a user performing one or more of sending, posting, liking, commenting, and other actions.

The component 302, e.g., retrieves the post and the related posts in the conversation or message stream. The component 302 may analyze the detected post and related posts and determine the subject or topic of the post, the opinion and sentiment associated with the post, the tone of the comments related to the post. The component 302 may determine that one or more of the subject, opinion, tone is more likely needing an action, and for example, trigger an action on the message.

In one embodiment, the component 302 may establish for the determined subject or topic, that a user (e.g., at 306) is an expert. The component 302 may queue the message, and responsive to that user posting about the message, allow the message to be shared. In one aspect, a monitor waiting on conditional reshare may be established.

In another aspect, the component 302 may be hook into or part of an electronic mail system, and perform the above described functionalities by detecting email messages that are sent, replied to, forwarded, or the like. The components (e.g., 302, 304, 306, 308, 310) shown in FIG. 3 run or execute on one or more processors such as a central processing unit or another processor.

Figure 4:
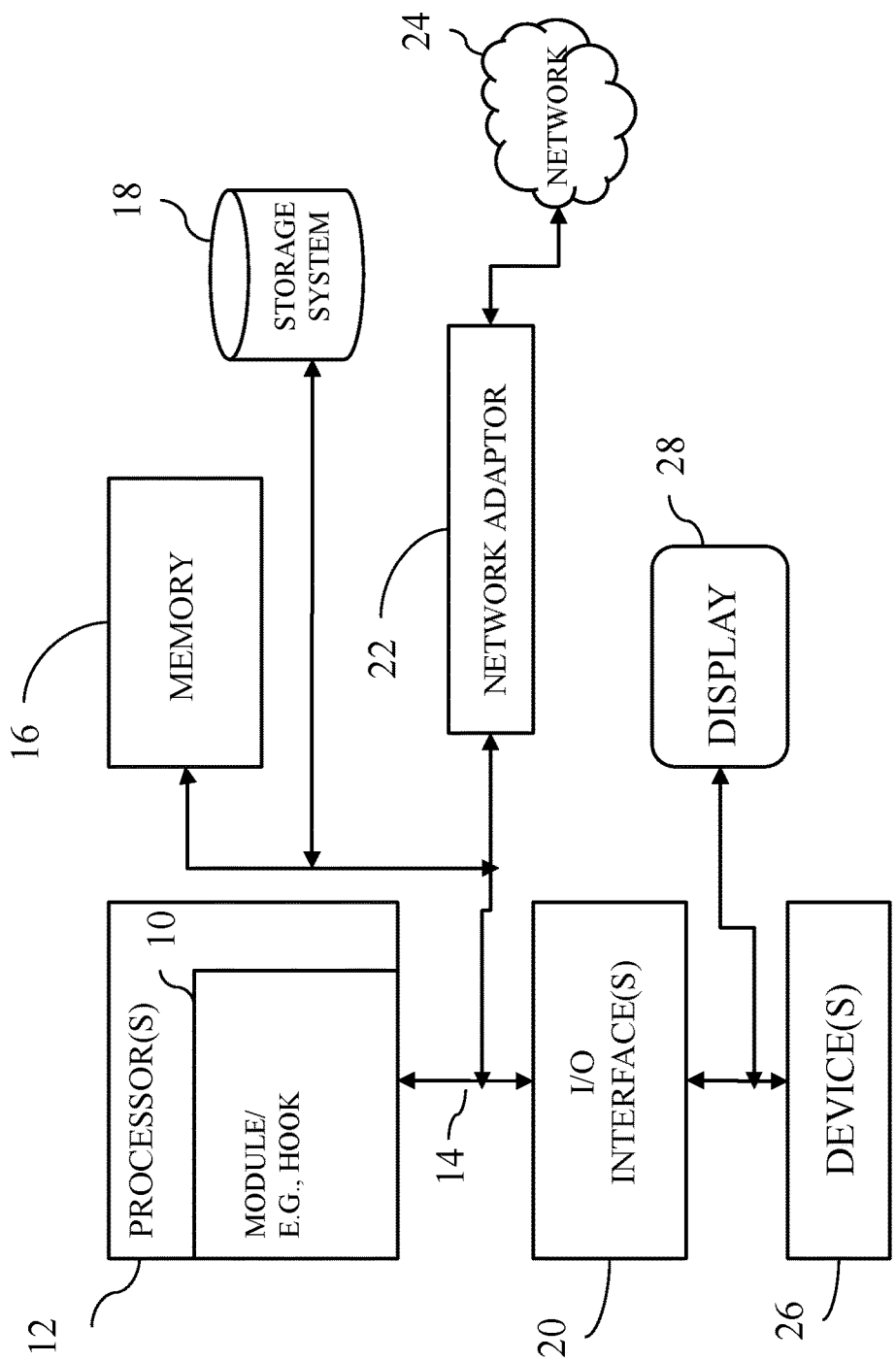
FIG. 4 illustrates a schematic of an example computer or processing system that may implement a system of controlling cascade of information in electronic platforms in one embodiment of the present disclosure.

FIG. 4 illustrates a schematic of an example computer or processing system that may implement a system of controlling cascade of information in electronic platforms in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of controlling cascade of information transmitted and received via a data sharing platform over at least one communication network, comprising:
   determining that a message is to be shared;
   analyzing the message and corresponding message stream;
   queuing the message; and
   taking an action upon the message responsive to at least one criterion being met based on the analyzing, the action comprising at least forcing a fact check of the message that determines veracity of the message, and at least one of removing the message, disabling the message, allowing conditional sharing of the message, and allowing the message to be shared,
   the at least one criterion comprising at least determining a confidence value below a threshold value that indicates the message is non-factual,
   wherein spreading of information determined to be non-factual is reduced.

2. The method of claim 1, wherein the determining that a message is to be shared, comprises at least one of:
   hooking onto a component of an online data sharing platform to detect a message that is to be shared;
   listening to Document Object Model (DOM) changes;
   listening to compliance and analytics streams; and
   listening to submit and post button for postings.

3. The method of claim 1, wherein the analyzing comprises analyzing the message, associated author, associated content, associated readers, at least one user action on the message, sentiment and tone of comments associated with the message, downstream shares and upstream shares of the message.

4. The method of claim 1, wherein the online data sharing platform comprises at least one of electronic mail, instant message platform, wiki, and an online social network platform comprising wall, activity stream, timeline, profile.

5. The method of claim 1, wherein the action comprises said allowing conditional sharing of the message, wherein the message is allowed to be shared only if an expert on a topic of the message also commented on the message.

6. The method of claim 1, wherein the data sharing platform comprises an asynchronous social networking platform.

7. A computer readable storage medium storing a program of instructions executable by a machine to perform a method of controlling cascade of information transmitted and received via a data sharing platform over at least one communication network, comprising:
   determining that a message is to be shared;
   analyzing the message and corresponding message stream;
   queuing the message; and
   taking an action upon the message responsive to at least one criterion being met based on the analyzing, the action comprising at least forcing a fact check of the message that determines veracity of the message, and at least one of removing the message, disabling the message, allowing conditional sharing of the message, and allowing the message to be shared,
   the at least one criterion comprising at least determining a confidence value below a threshold value that indicates the message is non-factual,
   wherein spreading of information determined to be non-factual is reduced.

8. The computer readable storage medium of claim 7, wherein the determining that a message is to be shared, comprises at least one of:
   hooking onto a component of an online data sharing platform to detect a message that is to be shared;
   listening to Document Object Model (DOM) changes;
   listening to compliance and analytics streams; and
   listening to submit and post button for postings.

9. The computer readable storage medium of claim 7, wherein the analyzing comprises analyzing the message, associated author, associated content, associated readers, at least one user action on the message, sentiment and tone of comments associated with the message, downstream shares and upstream shares of the message.

10. The computer readable storage medium of claim 7, wherein the online data sharing platform comprises at least one of electronic mail, instant message platform, wiki, and an online social network platform comprising wall, activity stream, timeline, profile.

11. The computer readable storage medium of claim 7, wherein the action comprises said allowing conditional sharing of the message, wherein the message is allowed to be shared only if an expert on a topic of the message also commented on the message.

12. A system of controlling cascade of information transmitted and received via an online data sharing platform over a communication network, comprising:
   at least one hardware processor;
   a memory device coupled to the at least one hardware processor,
   the at least one hardware processor operable to determine that a message is to be shared, the at least one hardware processor further operable to analyze the message and corresponding message stream, the at least one hardware processor further operable to queue the message on the memory device, the at least one hardware processor further operable to take an action upon the message responsive at least one criterion being met based on the analyzing,
   the action comprising at least forcing a fact check of the message that determines veracity of the message, wherein the at least one hardware process associates a trust metric to an author of the message, and reduces the trust metric responsive to finding that the message comprises non-factual data, and reduces spreading of information determined to be non-factual.

13. The system of claim 12, wherein the action further comprises at least one of removing the message, disabling the message, allowing conditional sharing of the message, and allowing the message to be shared, the at least one criterion comprising at least determining a confidence value below a threshold value that indicates the message is non-factual.

14. The system of claim 12, wherein the at least one hardware processor determines that a message is to be shared, by at least one of hooking onto a component of an online data sharing platform to detect a message that is to be shared, listening to Document Object Model (DOM) changes, and listening to compliance and analytics streams, listening to submit and post button for postings.

15. The system of claim 12, wherein the at least one hardware processor analyzes the message by determining associated author, associated content, associated readers, at least one user action on the message, sentiment and tone of comments associated with the message, downstream shares and upstream shares of the message.

16. The system of claim 12, wherein the online data sharing platform comprises at least one of electronic mail, instant message platform, wiki, and an online social network platform comprising wall, activity stream, timeline, profile.

17. The system of claim 13, wherein the action comprises said allowing conditional sharing of the message, wherein the message is allowed to be shared only if an expert on a topic of the message also commented on the message.

18. The system of claim 12, wherein the data sharing platform comprises an asynchronous network platform.

19. The system of claim 12, wherein the data sharing platform comprises a synchronous network platform.

* * * * *